(12) United States Patent
Sebes et al.

(10) Patent No.: US 7,783,735 B1
(45) Date of Patent: Aug. 24, 2010

(54) CONTAINMENT OF NETWORK COMMUNICATION

(75) Inventors: E. John Sebes, Menlo Park, CA (US); Bakul Shah, Los Altos, CA (US); Rosen Sharma, Los Gatos, CA (US)

(73) Assignee: McAfee, Inc., Santa Clara, CA (US)

( * ) Notice: Subject to any disclaimer, the term of this patent is extended or adjusted under 35 U.S.C. 154(b) by 1433 days.

(21) Appl. No.: 10/806,578

(22) Filed: Mar. 22, 2004

(51) Int. Cl.
*G06F 15/173* (2006.01)

(52) U.S. Cl. .................... 709/223; 709/225; 709/226

(58) Field of Classification Search .................. None
See application file for complete search history.

(56) References Cited

U.S. PATENT DOCUMENTS

| | | | |
|---|---|---|---|
| 4,688,169 A | 8/1987 | Joshi | 364/200 |
| 4,982,430 A | 1/1991 | Frezza et al. | 380/50 |
| 5,155,847 A | 10/1992 | Kirouac et al. | |
| 5,222,134 A | 6/1993 | Waite et al. | 380/4 |
| 5,390,314 A | 2/1995 | Swanson | 395/500 |
| 5,521,849 A | 5/1996 | Adelson et al. | 364/570 |
| 5,560,008 A | 9/1996 | Johnson et al. | 395/650 |
| 5,699,513 A | 12/1997 | Feigen et al. | 395/187.01 |
| 5,778,349 A | 7/1998 | Okonogi | 707/1 |
| 5,787,427 A | 7/1998 | Benantar et al. | |
| 5,842,017 A | 11/1998 | Hookway et al. | 395/707 |
| 5,907,709 A | 5/1999 | Cantey et al. | 395/705 |
| 6,192,401 B1 | 2/2001 | Modiri et al. | |
| 6,275,938 B1 | 8/2001 | Bond et al. | 713/200 |
| 6,356,957 B2 | 3/2002 | Sanchez, II et al. | 709/328 |
| 6,393,465 B2 | 5/2002 | Leeds | 709/207 |
| 6,442,686 B1 * | 8/2002 | McArdle et al. | 713/151 |
| 6,453,468 B1 | 9/2002 | D'Souza | |
| 6,587,877 B1 * | 7/2003 | Douglis et al. | 709/224 |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | 717/126 |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,918,110 B2 | 7/2005 | Hundt et al. | |
| 6,930,985 B1 | 8/2005 | Rathi et al. | |
| 6,988,124 B2 | 1/2006 | Douceur et al. | |
| 7,010,796 B1 | 3/2006 | Strom et al. | |
| 7,039,949 B2 | 5/2006 | Cartmell et al. | |
| 7,065,767 B2 | 6/2006 | Kambhammettu et al. | |

(Continued)

OTHER PUBLICATIONS

Kurt Gutzmann, "Access Control and Session Management in the HTTP Environment," Jan./Feb. 2001, pp. 26-35, IEEE Internet Computing.

(Continued)

*Primary Examiner*—John B. Walsh
(74) *Attorney, Agent, or Firm*—Patent Capital Group

(57) ABSTRACT

Invention selectively enables usage of services and communication conduits in a computer network, wherein the enablement is contingent on usage conditions, resulting in containment of the spread of unauthorized activity within a networked computer system and limiting the scope of results when an element becomes part of a hostile execution environment. Instead of protecting individual networked elements from a potentially hostile execution environment, the elements' usage of the networked environment is restricted to the extent of selectively allowing usage of needed resources explicitly authorized for use by such elements.

41 Claims, 12 Drawing Sheets

U.S. PATENT DOCUMENTS

| | | | | |
|---|---|---|---|---|
| 7,082,456 | B2* | 7/2006 | Mani-Meitav et al. | 709/203 |
| 7,093,239 | B1 | 8/2006 | van der Made | |
| 7,124,409 | B2 | 10/2006 | Davis et al. | |
| 7,139,916 | B2 | 11/2006 | Billingsley et al. | |
| 7,152,148 | B2* | 12/2006 | Williams et al. | 711/164 |
| 7,159,036 | B2 | 1/2007 | Hinchliffe et al. | |
| 7,177,267 | B2 | 2/2007 | Oliver et al. | |
| 7,203,864 | B2 | 4/2007 | Goin et al. | |
| 7,251,655 | B2 | 7/2007 | Kaler et al. | |
| 7,290,266 | B2 | 10/2007 | Gladstone et al. | |
| 7,302,558 | B2 | 11/2007 | Campbell et al. | |
| 7,330,849 | B2 | 2/2008 | Gerasoulis et al. | |
| 7,350,204 | B2 | 3/2008 | Lambert et al. | |
| 7,353,501 | B2 | 4/2008 | Tang et al. | |
| 7,363,022 | B2 | 4/2008 | Whelan et al. | |
| 7,370,360 | B2 | 5/2008 | van der Made | |
| 7,406,517 | B2 | 7/2008 | Hunt et al. | |
| 7,441,265 | B2 | 10/2008 | Staamann et al. | |
| 7,464,408 | B1 | 12/2008 | Shah et al. | |
| 7,506,170 | B2 | 3/2009 | Finnegan | |
| 7,607,170 | B2 | 10/2009 | Chesla | |
| 7,657,599 | B2 | 2/2010 | Smith | |
| 7,698,744 | B2 | 4/2010 | Fanton et al. | |
| 2002/0099671 | A1 | 7/2002 | Mastin Crosbie et al. | 705/500 |
| 2003/0073894 | A1 | 4/2003 | Chiang et al. | 600/407 |
| 2003/0074552 | A1 | 4/2003 | Olkin et al. | 713/150 |
| 2003/0120601 | A1 | 6/2003 | Ouye et al. | |
| 2003/0120811 | A1* | 6/2003 | Hanson et al. | 709/245 |
| 2003/0120935 | A1 | 6/2003 | Teal et al. | 713/188 |
| 2004/0003258 | A1 | 1/2004 | Billingsley et al. | |
| 2004/0015554 | A1 | 1/2004 | Wilson | 709/206 |
| 2004/0051736 | A1 | 3/2004 | Daniell | 345/752 |
| 2004/0054928 | A1 | 3/2004 | Hall | |
| 2004/0167906 | A1 | 8/2004 | Smith et al. | |
| 2004/0230963 | A1 | 11/2004 | Rothman et al. | 717/168 |
| 2004/0255161 | A1 | 12/2004 | Cavanaugh | 713/201 |
| 2005/0018651 | A1 | 1/2005 | Yan et al. | |
| 2005/0108562 | A1 | 5/2005 | Khazan et al. | |
| 2005/0114672 | A1 | 5/2005 | Duncan et al. | |
| 2005/0228990 | A1 | 10/2005 | Kato et al. | 713/167 |
| 2005/0262558 | A1 | 11/2005 | Usov | |
| 2005/0273858 | A1 | 12/2005 | Zadok et al. | |
| 2006/0015501 | A1 | 1/2006 | Sanamrad et al. | |
| 2006/0080656 | A1 | 4/2006 | Cain et al. | |
| 2006/0236398 | A1 | 10/2006 | Trakic et al. | |
| 2007/0039049 | A1 | 2/2007 | Kupferman et al. | |
| 2007/0083522 | A1 | 4/2007 | Nord et al. | |
| 2007/0101435 | A1 | 5/2007 | Konanka et al. | |
| 2009/0320140 | A1 | 12/2009 | Sebes et al. | |
| 2010/0100970 | A1 | 4/2010 | Chowdhury et al. | |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al. (To Issue Oct. 13, 2009 as 7,603,683).

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

* cited by examiner

CONTAINMENT OF NETWORK COMMUNICATION

BACKGROUND

1. Field

Invention relates to computer networks, and in particular to selectively enabling the use of a network-connected computer so that only resources needed for legitimate and authorized use are available.

2. Related Art

A "networked information system" is a collection of computers, together with network communication devices and transmission media that enable the computers to communicate with one another. The limits of a particular system are defined by boundaries that are based on real-world relationships of information technology (IT) asset ownership and operational responsibility. These boundaries are enforced largely by both network-level boundary security mechanisms (firewalls, Virtual Private Networks (VPNs), remote access) and boundary management mechanisms (address management, routing relationships and limitations). Current information technology includes boundary-defining and boundary-enforcing mechanisms that are feasible to use because of relatively simple rules about communication allowed across boundaries. Abuses of the allowed communication capabilities are still possible, via the allowed communication channels. Despite these remaining vulnerabilities, it is still possible to define reasonably simple sets of rules to define the extent of networked system, even if the resulting boundary is sufficiently porous (explicitly allowing various kinds of network access to various kinds of parties not limited to employees) to call into question whether the "boundary" can be described as a "border."

However, within such boundaries, every non-trivial networked IT system has many actors and objects that are massively multi-inter-related with one another. Almost every network-connected system has potential access of almost every kind to almost every service available with the networked system. Coarse-grained access-control and segmentation can, at best, create sub-systems that are internally massively multi-inter-related, and still highly inter-related to one another.

Even for modest numbers of actors and services, there are large numbers of paths of potential access. Most paths are not intended for use, typically not used, but nevertheless available for abuse or unintentional misuse. Abuse and misuse are particularly troublesome because any one host in a network, if compromised in some way, can spread the effects to many other hosts which can in turn trigger further spread. This high degree of interconnection, and potential for wide and rapid cascading effects, is common to many aspects of IT systems, including security (e.g., malicious software spreading from host to host) to availability (e.g., local performance dysfunction spreading to effect other systems that share a network segment with dysfunctional system).

Accordingly, there is a need to drastically reduce the number of paths that be used at all, and make the use of any such path to be contingent on conditions that can further constrain usage.

SUMMARY

Invention selectively enables usage of services and communication conduits in a computer network, wherein the enablement is contingent on usage conditions, resulting in containment of the spread of unauthorized activity within a networked computer system and limiting the scope of results when an element becomes part of a hostile execution environment. Instead of protecting individual networked elements from a potentially hostile execution environment, the elements' usage of the networked environment is restricted to the extent of selectively allowing usage of needed resources explicitly authorized for use by such elements.

DETAILED DESCRIPTION

Figure 1:
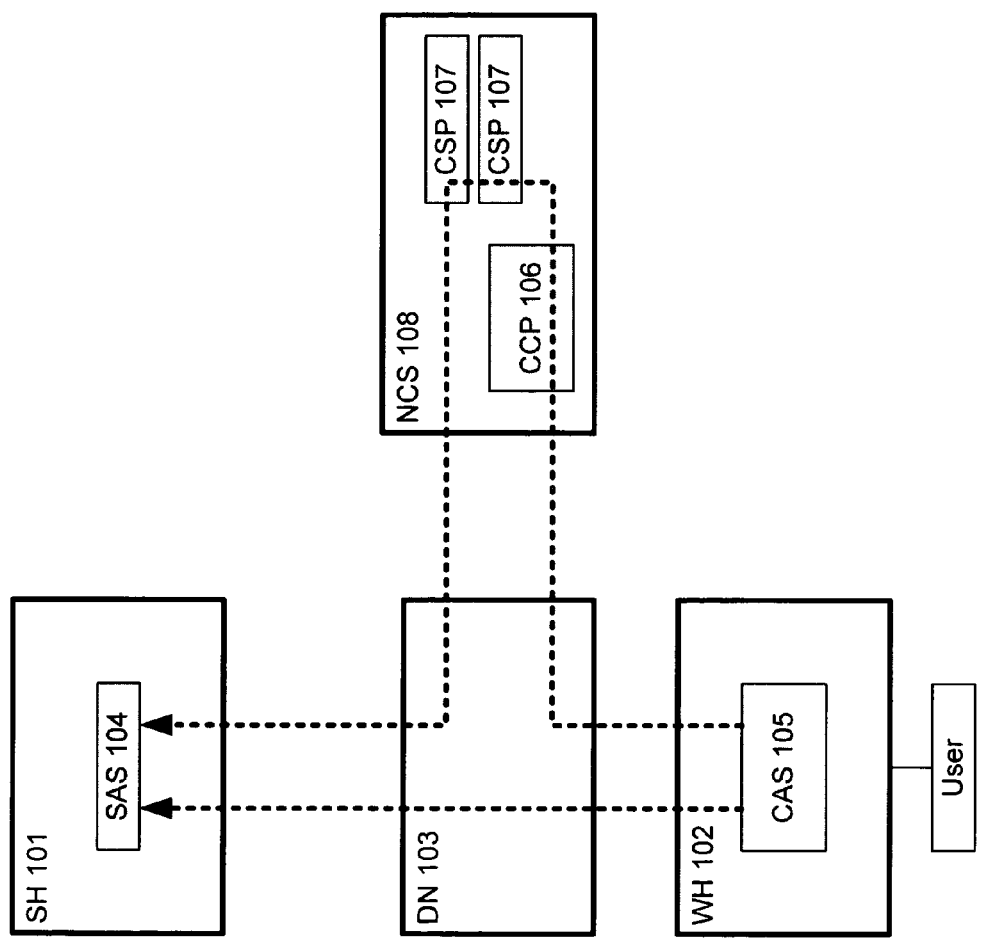
FIG. 1 is diagram illustrating the containment of network communication, according to an embodiment of the present invention.

The following serves as a glossary of terms as used herein:

Network Communication Path (Communication Path or Path): A sequence of hops in a computer network leading from one network node (host) to another network node (host).

Containment Technique: The Invention is a method to contain the capabilities of any network-connected computer so that software running on it lacks all communication capabilities except those that are specifically needed for legitimate use by authorized software on the host. A containment technique is a technique that selectively enables communication between specific systems.

Conduit: Containment is accomplished by selectively enabling any software on a host (especially but not limited to networked application client software) to use a communication conduit. A conduit is an ability to create a communication session from the local host to a host offering a service, where the session uses a communication channel for the service. For example, there is a very common pair of conduits used by many workstation hosts that: (a) communicate over a conduit to a mail server using TCP and port 110, in order to use a POP3 service for receiving email, and (b) communicate over a conduit to a mail server using TCP and port 24 to use an SMTP service for sending mail. A critical aspect of conduits in practice today is that most hosts have the ability to use a conduit to many services running on many other network-accessible hosts: While the number of such conduits is large, most of them are not authorized for usage, but are still available for accidental or malicious abuse with potentially harmful results.

Contingent Usage: A key concept of containment is that all of a contained system's usage is contingent upon a containment mechanism's determination that usage of a conduit is legitimate. The specific form of legitimacy is not intrinsic to contingent usage, for example, legitimacy could be based on human confirmation, comparison with historical usage, inspection of configuration information, out-of-band approval, deferred out-of-band approval, peak usage timeframe, or combinations of these.

Network Containment: Ensuring that, for any specific network-connected host, the only conduits available to that host are the conduits needed for legitimate usage of network-available services, or needed to offer such services. For example, desktop containment limits the conduits to those that are identified as pertinent to software used by the human operator of the workstation.

Service Containment: Ensuring that, for any specific network-available service, usage of conduits for that service can be limited in the following manner: not all of the service's request-types can be used by all of the service's consumers. Instead, requests within a specific conduit can be limited to those needed for legitimate usage of the specific system using the conduit. For example, in desktop containment, usage of email services would be limited to the conduits to only the email services used by the specific workstation, limited to the specific requests needed by email client software, and some of those request further limited in some circumstance to require human confirmation, e.g., sending email with attachments.

Request Message (Request): A message sent to some Server Application Software by some Client Application Software. A request comprises a request-type.

Request-type: A type of a request message, request type is defined by the containment mechanism for the service, and need not be (though it can be) based on service-specific distinctions such application-protocol or service-protocol message type. An example of an alternative is to treat a DATA message of the SMTP service protocol (used to send an email message) to be of one request-type if the message has an attachment, and another request-type if not.

Contained: A host is contained if there is a containment mechanism that selectively enables the usage of all conduits, and enables the use of only those that are actually needed. Selective enablement of usage applies both to the ability to make any use of a conduit (to make requests for any requests implemented by the server), and also to the ability to use the conduit to make a specific request. An important consequence is the other hosts in a network are protected from abuse by a contained host, where the abuse is by means of a conduit that is not needed for legitimate use by authorized software on the host. Similar, finer-grained protection is a consequence of containing the use of specific requests.

Usage on Demand: a critical aspect of containment is that a contained system has no immediate unconditional usage of any conduit. Rather, any usage of any conduit is mediated by a containment mechanism that intercepts demands for conduit usage, and makes the conduit available only when that demand meets pre-defined conditions for usage. Contingent usage is the result of enforcing usage on demand.

Usage on Human Demand: a form of contingent usage where usage of conduit is contingent upon a containment mechanism that assures that the demanded usage is a result of a human-originated request.

Communication Capability Mapping: An uncontained host has the ability to attempt to communicate (and in most cases succeed) with any other network-accessible host. The capability to communicate is based on a set of identifiers (a "name space") of communication endpoints it can connect to. In a typical TCP/IP network, the name space includes IP addresses, MAC addresses (such as Ethernet addresses), service ports (e.g., for TCP and UDP), etc. In general, containment fundamentally rests on the ability of a containment mechanism to control the name space and change the mapping from names to accessible entities. For network-level containment, containment mechanisms control the mappings between services and service ports, IP addresses and MAC addresses and physical communication ports. A contained host is one that has no ability to attempt to communicate except via a containment mechanism that controls these mappings. For example, in the most extreme case, all IP addresses are mapped to single MAC address controlled by a network containment mechanism that discards all communication, effectively blocking all communication. For practical containment, this control is used to selectively enable the use of specific conduits.

Communication Rights: communication rights are the combination of communication capability mapping and usage on demand. A containment mechanism selectively enables usage within a contained system by using communication capability mapping. Consequently, the contained system's communication capability is limited to only those conduits for which the conduit's usage conditions permit usage by the contained system. For each of those conduits, the contained system has a communication right. Persistence of a communication right can vary from case to case, e.g., persistent until removed administratively, persistent for some fixed duration, persistent until a specific event, persistent only for one communication session, etc.

Asymmetric Enablement of Communication: A feature of the present invention is the ability to selectively enable usage of communication conduits asymmetrically. That is, a conduit is by definition directional, because one of the two communicating parties initiated the communication. If a conduit from a host A to a host B is enabled, the analogous conduit is not necessarily enabled.

Service-Specific Contingent Usage: In any given usage scenario, containment mechanisms are applied selectively to services (and requests within services) based on the nature of the service, specific threats, or specific harmful effects that could result from abuse of the service. Depending on the nature of the service, it may make sense for the granularity of contingent usage to be any of: individual conduits, individual requests within a conduit, selected subset of requests, entire session, multiple sessions in a time window, etc.

Server Host (SH): the computer that is running a service that may be used by a human, via client software.

Server application software (SAS): the software that runs on the server, and implements a service.

Workstation Host (WH): the computer used by a human to execute client software to make use of network-accessible services.

Client application software (CAS): software that runs on a workstation, implements the application's network programming interface, and uses it to formulate service requests, send them over a network to the server, and receive responses from the server via the network.

Containment Communication Proxy (CCP): software that can intercept, and enable or disable, communication from a WH to an SH. A CCP may be placed in a variety of positions (and combinations of positions) along a conduit, including: on the WH in the path of selective enablement of network usage; on the SH in the path of receiving service request messages; on another network-connected system in the communication path between the WH and SH. The interception function of a CCP may vary depending on deployment; the conditional usage functions are the same.

Containment Service Proxy (CSP): software that can intercept, and enable or disable, specific requests requested via conduits of communication from a WH to an SH. A CSP may be placed in the same variety of positions as a CCP, again with the conditional usage functions being independent of placement.

Networked Containment Server (NCS): a host running a CCP and/or one or more CSPs (one per service that requires service-level containment) in order to execute containment functions without deploying software to existing WHs or SHs.

Data network (DN): A medium used for communication between computers, including communication between servers and workstations. A DN may be wired, wireless, optical, satellite-linked or a combination thereof.

Network Element (NE): A communication device that implements part of a data network by copying data between the device's physical communication interfaces to a communication medium; for example, routers, switches, hubs, wireless network hubs.

User: a human using a workstation and potentially other communication devices.

A problem addressed herein is rooted in a common feature of most data networks: software running on a computer has network access to, and service usage of, every network-accessible service or application, regardless of whether a service is needed by any software running on the computer. Further, for each networked service that is used by software on a computer, potentially all of the service's requests are available, regardless of whether the request is needed by any software running on the computer.

An advantageous aspect of the present invention is the containment of the spread of malicious software within a networked IT system, with the goal of containing the network-connected hosts so that the rest of the system is protected from abuse by such hosts. This goal is in distinction from the typical security model, wherein a security mechanism is applied to an asset in order to protect the asset from a potentially hostile execution environment. Instead, the goal of containment is to limit the scope of downside results when an asset becomes part of a hostile execution environment. To contain a network-connected host, a containment mechanism inverts the typical usage model (wherein almost everything is potentially available) to selectively allow a host usage of only what the host needs, wherein the host's need is not based on a priori rules as in the access-control approach. Another advantageous aspect of the present invention resulting from selectively allowing usage of needed resources is a limit on the scope for insider abuse.

An Approach to Containment Via Selective Enablement of Conduit Usage

Implementing containment via selective enablement of conduit usage is an approach that is based on these fundamental mechanisms:

1. Controlling the mappings of the identifiers used for any network communication.
2. Intercepting and mediating attempts to perform network communication or use network-available services or applications.
3. Handling conditions:
    Associating conditions with services (or requests within services).
    Evaluating those conditions in order to determine whether to block the requested service (or request) from being used by the requesting host.
    Administrative functions to modify the conditions.
4. Enabling communication for which the required conditions are met.

Note that while the present invention comprises interception of network communication attempts evaluation for selectively allowing usage, in different cases different interception mechanisms may be used and/or different conditions may apply to different services.

FIG. 1 is a diagram illustrating the containment of network communication, according to an embodiment of the present invention. Server host 101 and workstation host 102 communicate via data network 103 to exchange messages. The messages originate from, or are delivered to, software running on the hosts, such as server application software 104 running on server host 101 or client application software 105 running on workstation host 102. A containment communication proxy (CCP) 106 for the workstation host 102 and multiple containment service proxies (CSP) 107 (one per service that requires service-level containment) are shown as deployed on a networked containment server (NCS) 108, wherein the NCS 108 uses one or more interception techniques (described below) in order to be logically in the data path between workstation host 102 and server host 101 when needed. NCS 108 intercepts attempts to use a conduit, shown by right arrow through the NCS 108, and selectively enables conduit usage, shown by left arrow not passing through the NCS. The arrow on the left represents the data path for CCP-enabled conduits, while the arrow on the right represents the default data path used for intercepting attempts at initiating conduit usage.

Figure 2:
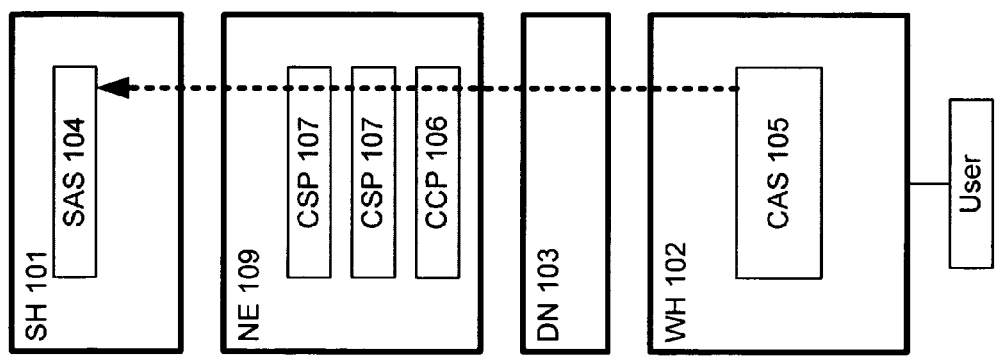
FIG. 2 is a diagram illustrating the containment of network communication, wherein the containment communication proxy and the containment service proxy are resident on a network element, according to an embodiment of the present invention.

FIG. 2 is a diagram illustrating the containment of network communication, wherein the CCP 106 and one or more CSPs 107 are resident on a network element 109, according to an embodiment of the present invention. In this embodiment, network element 109 (e.g. a switch or a router) provides the platform on which the CCP 106 and one or more CSPs 107 run. This allows CCP 106 and CSPs 107 to intercept communication between workstation host 102 and server host 101 by being physically in the network data path between the hosts. Hence all communication is accessible to the CCP 106 or CSP 107, though not all communication is necessarily handled by the CCP 106 or CSP 107.

Figure 3:
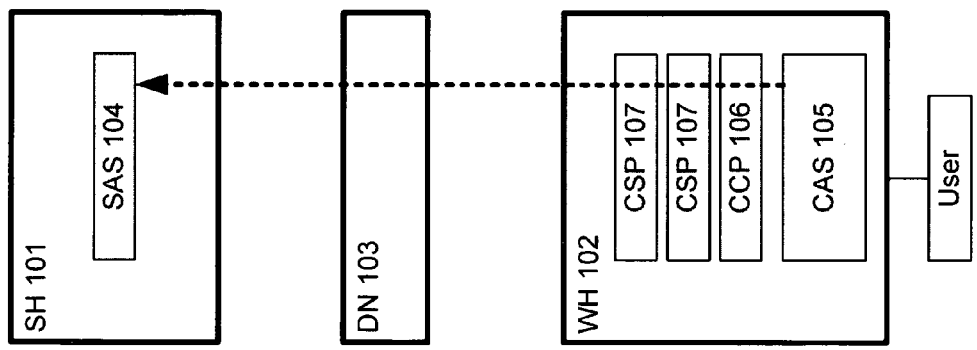
FIG. 3 is a diagram illustrating the containment of network communication, wherein the containment communication proxy and the containment service proxy execute locally on the workstation host, according to one embodiment of the present invention.

FIG. 3 is a diagram illustrating the containment of network communication, wherein the CCP 106 and the CSP 107 execute locally on the workstation host 102, according to one embodiment of the present invention. Workstation host 102 uses one or more services provided by one or more server hosts 101 (only one server host 101 is shown in FIG. 3). Execution on the workstation host 102 allows CCP 106 and one or more CSPs 107 to be in the data path between workstation host 102 and server host 101, making all communication accessible to the CCP 106 or CSP 107, though not all communication is necessarily handled by the CCP 106 and CSPs 107. The one or more CSPs 107 correspond to the one or more services (provided by the one or more server hosts 101) designated to have service-level containment.

Figure 4:
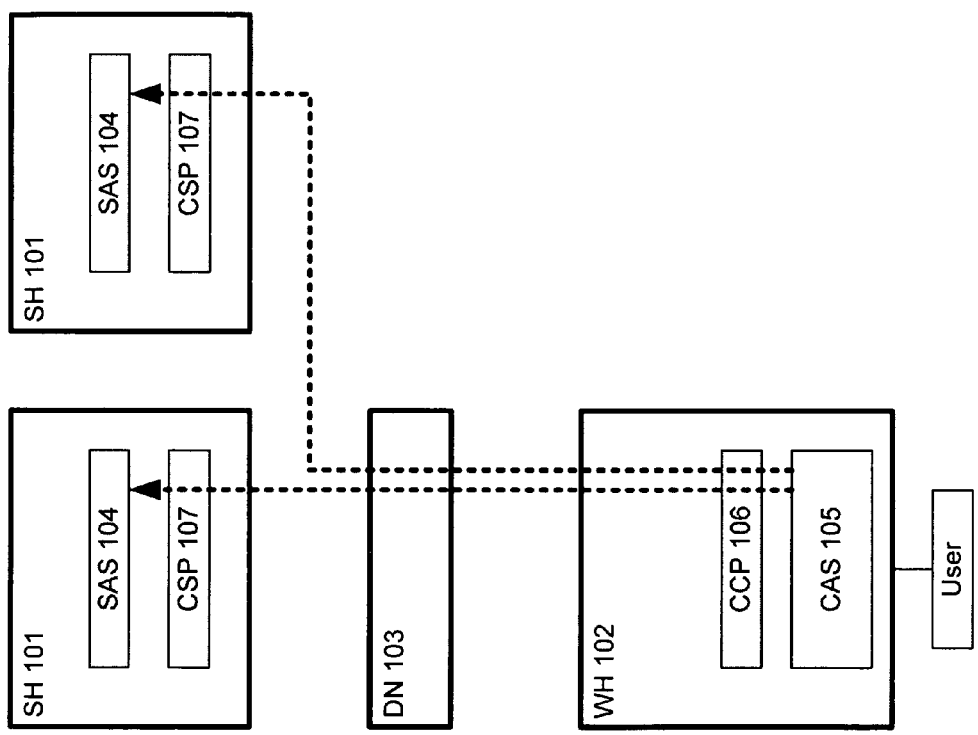
FIG. 4 is a diagram illustrating the containment of network communication, wherein the containment service proxies are deployed on one or more server hosts, according to one embodiment of the present invention.

FIG. 4 is a diagram illustrating the containment of network communication, wherein the CSPs 107 are deployed on one or more server hosts 101, according to one embodiment of the present invention. In this embodiment, one or more server hosts 101 provide services designated for service-level containment. One or more corresponding CSPs 107 are deployed on said server hosts 101, wherein the CSPs 107 intercept service requests locally (on the server hosts 101) while CCP 106 functions are implemented on one or more corresponding workstation hosts 102 (only one workstation host 102 shown in FIG. 4). As above, this embodiment allows CCP 106 and CSPs 107 to intercept communication between workstation host 102 and server host 101 by being physically in the network data path between the hosts, making communication accessible to the CCP 106 or CSPs 107, though not all communication is necessarily handled by the CCP 106 or CSP 107.

Figure 5:
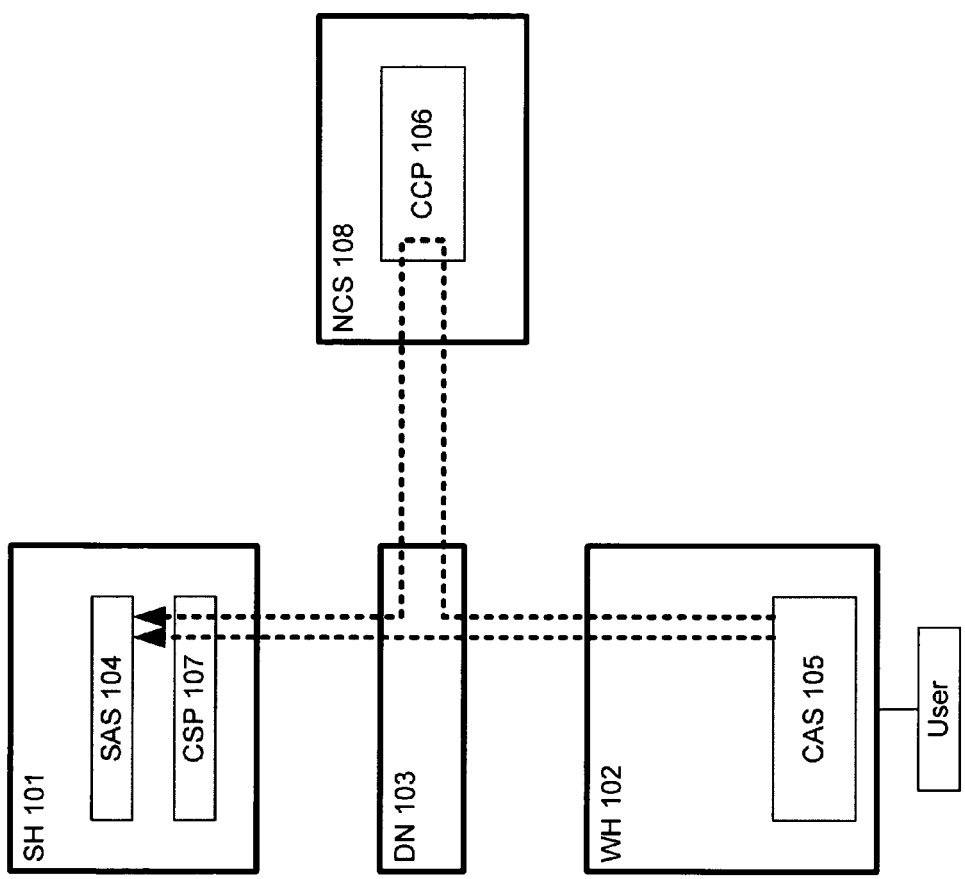
FIG. 5 is a diagram illustrating the containment of network communication, wherein the containment service proxies are on server hosts while containment communication proxy functions are implemented on a networked containment server, according to one embodiment of the present invention.

FIG. 5 is a diagram illustrating the containment of network communication, wherein CSPs 107 are on server hosts 101 while CCP 106 functions are implemented on an NCS 108, according to one embodiment of the present invention. In this embodiment, a server application software 104 designated for service-level containment runs on server hosts 101, and a corresponding CSP 107 on server host 101 intercepts communication to server host 101 for providing said service-level containment, with CCP 106 functions implemented in an NCS 108. NCS 108 intercepts attempts to use a conduit, shown by right arrow through the NCS 108, and selectively enables conduit usage, shown by left arrow not passing through the NCS. The arrow on the left represents the data path for CCP-enabled conduits, while the arrow on the right represents the default data path used for intercepting attempts at initiating conduit usage. Optionally, one or more pieces of server application software 104 run on one or more server hosts 101 (only one server host 101 shown in FIG. 5), with corresponding CSPs 107 for the implemented services.

Figure 6:
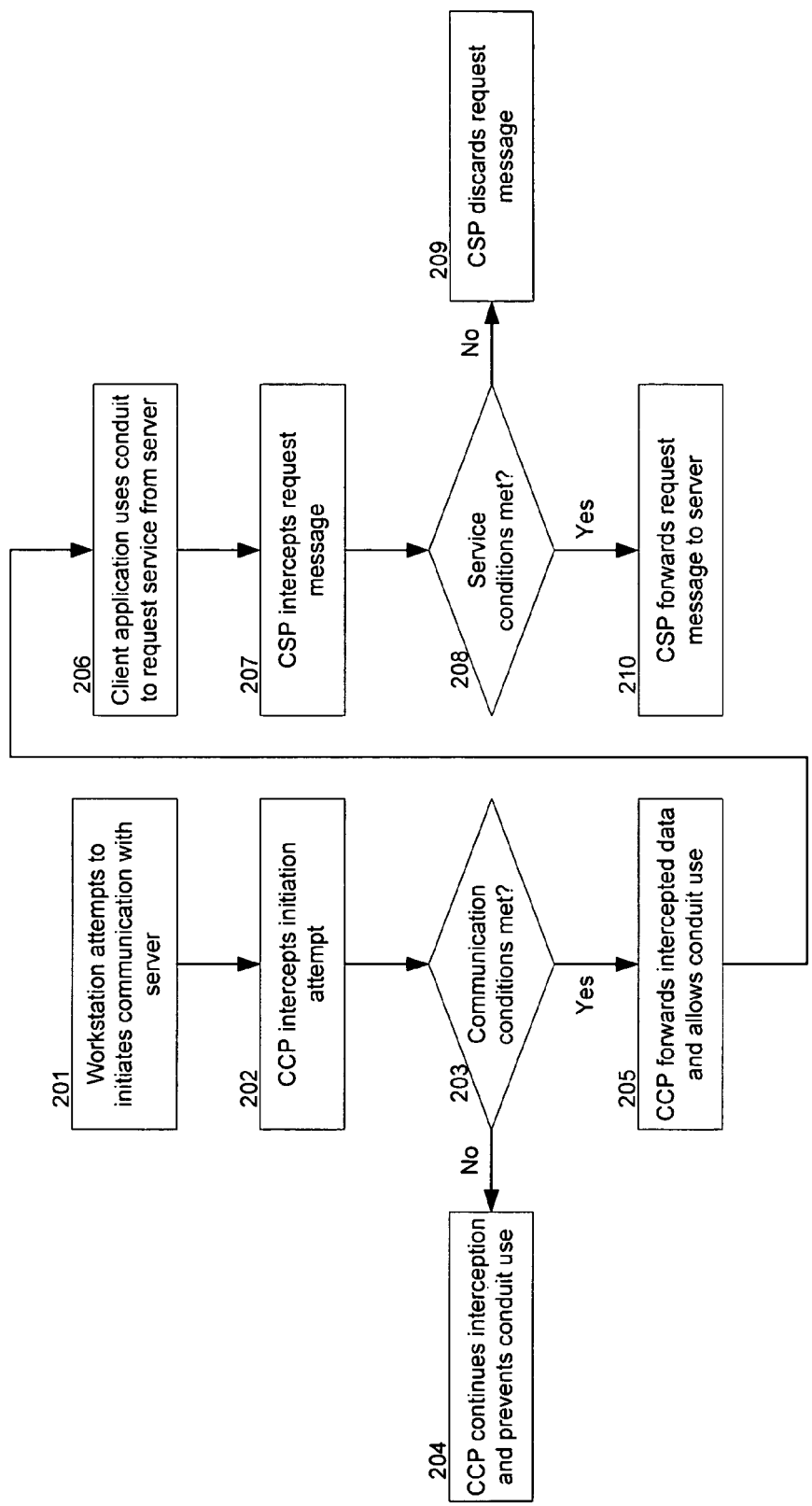
FIG. 6 is a flow chart illustrating a method for the containment of network communication in the case where a network communication server is used for containment communication proxy functions and where the containment server proxy functions are implemented on one or more server hosts.

FIG. 6 is a flow chart illustrating a method for the containment of network communication in the case where an NCS 108 is used for CCP 106 functions and where the CSP 107 functions are implemented on one or more server hosts 101. FIG. 6 follows the embodiment illustrated in FIG. 5 as an illustrative example. For the embodiments shown in FIGS. 1-4 the steps of operation and data flows are analogous, and the placement of the CCP 106 and CSP 107 is changed. As shown in FIG. 6, the elements interact via communicating in the following sequence of messages and actions. Client application software 105 attempts to form a communication session to a server host 101, in preparation for sending a request message to the server application software 104 on the server host 101:

(a) Networking software on the workstation host 101 attempts 201 to initiate communication with the server host 101.
(b) The CCP 106 intercepts 202 the network packets for the initiation attempt.
(c) The CCP 106 determines 203 what conditions are required for the conduit (from the workstation host 102, to the server host 101, for the specific service on the server host 101) to be allowed and evaluates those conditions, if any. If the conditions are not met, the CCP 106 continues 204 to intercept any attempts to use the conduit, continues to prevent the workstation host 102 from using the conduit directly, and continues to discard protocol data units (e.g. packets and/or frames) from the workstation host 102 to the server host 101.
(d) If the conditions are met, the CCP 106 forwards 205 the intercepted network data, allowing the workstation host 102 to use the conduit. As an alternative, the CCP 106 can continue intercepting and forwarding traffic on the conduit (while remaining in the data path) to perform other operations, for example, as in FIG. 1 where the CCP 106 is on an NCS 108 which also includes a CSP 107 for the service for which the conduit is being used.
(e) The client application software 105 uses the conduit to send 206 a request message to the server application software 104.
(f) The request message is intercepted 207 by the CSP 107, the CSP 107 determining 208 whether the request message is for a request which requires one or more conditions to be met, and if so evaluates the conditions. If there are conditions that are not met, the message is discarded 209. Other actions may occur as needed, such as error notification, logging of events and/or actions, etc.
(g) If conditions are met, the message is forwarded 210 to the server application software 104.

Figure 7:
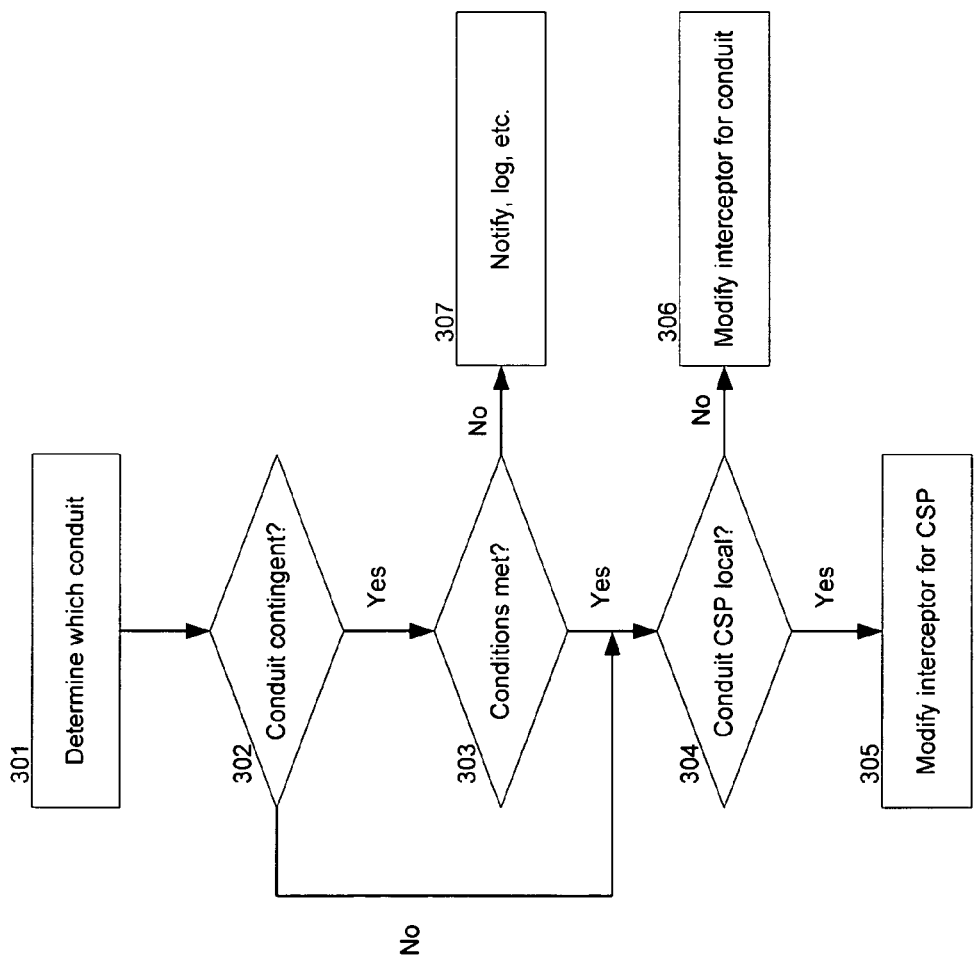
FIG. 7 is a flow chart illustrating a method for the containment of network communication as performed by a containment communication proxy, according to an embodiment of the present invention.

FIG. 7 is a flow chart illustrating a method for the containment of network communication as performed by a CCP 106, according to an embodiment of the present invention. Not shown in FIG. 7 are the steps of processing that a CCP 106 performs when it starts up, which are as follows:

Initialize the interception mechanism;
Wait to intercept attempts to begin using a conduit;
When such an attempt is intercepted, perform the processing shown in FIG. 7.

After above start-up, CCP 106 performs the following steps (as illustrated in FIG. 7):

(a) Determine 301 which conduit is the subject of attempted use, e.g. the source host, destination host, port usage, and services associated with ports. Go to (b).
(b) Is 302 the use of this conduit contingent on any conditions? If no, go to (d). If yes, go to (c).
(c) Are 303 the conditions met? If no, go to (g). If yes, go to (d).
(d) Is 304 the conduit used for a service that subject to further conditions checked locally? (Locally means by CSP 107 software running on the same host as the CCP 106 software). If no, go to (f). If yes, go to (e).

(e) Modify 305 interceptor to pass data on the conduit to the local CSP 107 for the service that the conduit is used for. End.

(f) Modify 306 the interceptor to not intercept data for this conduit. End.

(g) Perform 307 any needed notification, logging, etc. for this event of a usage of a conduit being blocked. End.

Note that the above processing depends on the following state data:

Step (a) involves checking state data that maps from PDU (protocol data unit, e.g. Ethernet frame, IP packet, ICMP packet) data (e.g., MAC address, Internet protocol suite protocol number, IP addresses, port numbers) to information about conduits and services used over conduits.

Step (b) involves checking state data that maps from conduits to conditions.

Step (c) involves using state data about conditions to determine the computation needed to evaluate conditions of Step (b).

The CCP 106 optionally enables an authorized administrator to update this state data, such as one or more maps from Step (b) above and/or conditions from Step (c) above.

Figure 8:
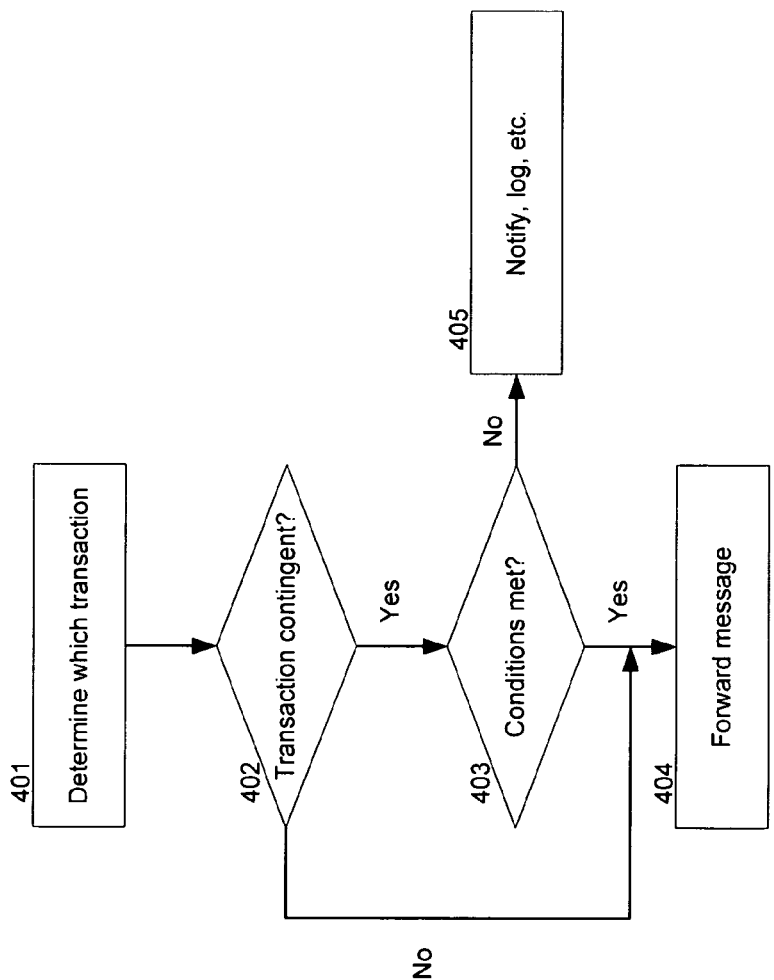
FIG. 8 is a flow chart illustrating a method for containment of network communication as performed by a containment service proxy, according to one embodiment of the present invention.

FIG. 8 is a flow chart illustrating a method for containment of network communication as performed by a CSP 107, according to one embodiment of the present invention. Not shown in FIG. 8 are the steps of processing that a CSP 107 performs when it starts up. That processing depends on whether the CSP 107 is running along with a CCP 106. If so, then there is no startup action, since the CCP 106 controls the interceptor and forwards intercepted data to the CSP 107. If not, then the startup action is as follows:

Initialize the interception mechanism;
Wait to intercept service messages sent over a conduit;
When such an attempt is intercepted, perform the processing shown in FIG. 8.

The following steps in FIG. 8 are performed by the CSP 108 for a request message of the service being contained:

(a) Determine 401 which request of the contained service is being requested in this message. Go to (b).

(b) Is 402 the use of this request contingent on any conditions? If no, go to (d). If yes, go to (c).

(c) Are 403 the conditions met? If no, go to 5. If yes, go to (d).

(d) Pass 404 the message to the server application software 104. End.

(e) Perform 405 any notification, logging, etc. and drop the message. End.

Note that the above processing depends on the following state data:

Step (a) comprises checking state data that maps from data in the message to the type of request being requested.

Step (b) comprises checking state data that indicates whether the type of request being requested is contingent upon any conditions, and if so what conditions.

Step (c) comprises using state data about conditions to determine the computation needed to evaluate each condition.

The CSP 107 optionally enables an authorized administrator to update this state data, such as the state data from Steps (a), (b) and/or (c) above.

Contingent usage depends on the evaluation of conditions pertinent to usage of conduit by a host. Contingent usage may be used with any type of condition that software can compute from data such as: information about the conduit, local state data, data acquired from external sources (e.g. time services, repositories of access control rules). However, there are a number of specific embodiments of contingent usage conditions that are most useful for implementing containment without any dependence on a potentially large or complex corpus of access control rules and policies. Among other examples, said types of conditions comprise the following examples:

Usage on human demand: A conduit is enabled for attempted use only if the containment mechanism can obtain human confirmation if the contained system is attempting (to use the service available via the conduit) in response to a human request. Likewise, use of a specific request of a service is enabled only if the containment mechanism can obtain human confirmation of the request.

Usage on demand with historical usage: A conduit (or request) is enabled only if previously used. For a particular condition, the interpretation of "previous" can include a number of factors including time and human involvement, e.g. previously used with human confirmation within a particular time frame.

Usage on demand previously authorized: When a contained system attempts to use a new conduit (or request) not used before (or not used within a time window), then the conduit (or request) remains disabled unless there has been administrative authorization of the usage. Typically, a first attempt would be blocked and result in a request for administrative authorization; when authorization is confirmed, a subsequent request would result in the conduit (or request being enabled).

Temporary usage on demand: Conduit (or request) enabled temporarily, with a timeout period, during which administrative authorization is sought.

Persistent usage: When a usage attempt succeeds following a set of fulfilled conditions, the communication right can be persistent so that a subsequent attempted use of the same conduit (or request) is met without the conditions having to be met again. Among other examples, types of persistence comprise: Persistent until removed administratively; persistent for some fixed duration; persistent until a specific event; persistent through a number of specific events; persistent only for one communication session; etc. These persistence types may be combined, for example: usage on human demand required for mounting a file share; communication right persistent for an entire session during which the share remains mounted (no further human confirmation needed for file opens, etc.); communication right persistent for 24 hours, so that if the file share is unmounted and remounted in the same day no human confirmation is required.

While a condition or set of combined conditions can be required for use of a particular conduit, it is not required that each of a great many potential conduits has a specific set of conditions. Rather, contingent usage can be based on a small number of conditions (or combined conditions):

A default condition for any conduit;

Specific alternative or additional conditions for conduits for specific services;

Specific alternative or additional conditions for requests of specific services;

Note that containment does not require the specialization of rules according to a specific contained system initiating the conduit usage (or transaction request), or a system providing a service, or a user identity, or an object identity (e.g. file ID), or other specific information about an originator or a target of a conduit. However, when one or more such rules for selectively enabling usage exist, they may be referenced by a condition.

In contrast however, the general method for determining the conditions required (step (a) in FIG. 7) is:

Determine which of several known services is used over the conduit, if any;

Use the conditions for that service, if any;

Use the default conditions, unless over-ridden by alternative conditions specific to the service, if any.

Likewise, the general method for determining the conditions required (step (a) in FIG. 8) is:

Determine the conditions specific to the request-type being requested, if any;

Use the conditions for that request-type, if any;

Use the default conditions for the service, unless over-ridden by alternative conditions specific to the request, if any.

Note that "request-type" is defined by the containment mechanism for the service, and need not be (though it can be) based on service-specific distinctions such as application-protocol or service-protocol message type. An example of an alternative is to treat a DATA message of the SMTP service protocol (used to send an email message) to be of one request-type if the message has an attachment, and another request-type if the message does not have an attachment.

It is an advantageous aspect of the present invention that a given containment mechanism may have, in addition to the set of conditions it currently enforces, an alternative set of conditions defined and available to replace the current set of conditions in toto. Each of potentially several of these alternative sets represents a containment regime, and the containment mechanism may switch between these regimes based on administrative actions or operating states, such as high-caution end-of-fiscal-quarter processing, high-risk situations resulting from security alerts or even security incidents in progress, time of day, network load, usage patterns, etc.

As illustrated in the above flowcharts, both CCP 106 and CSP 107 containment mechanisms depend on an interception mechanism which allows the containment mechanism to intercept communication and selectively enable communication rights. As shown in FIGS. 2-4, containment mechanisms may rely on existing interception mechanisms such as:

Being placed directly in the network data path between the systems whose usage of resources is selectively enabled by the specific containment mechanism as well as other systems which the contained systems can communicate with.

Being placed in a host's local data path for network communication, using techniques such as protocol stack shims and local proxy servers.

Additionally, the present invention teaches a novel technique (introduced in to FIGS. 1 and 5) for implementing an interception mechanism on an ordinary first computer, thereby allowing containment of the computers with which the first computer shares a switched network segment in the same broadcast domain. It is an advantageous aspect of the present invention that this technique can also be used when a CCP 106 is in-line, the technique being distinct from existing in-line interception in the following regard: whereas existing in-line mechanisms can intercept communication to and from a host and decide whether to selectively disallow the communication, the present invention prevents a contained host from communicating with another host (other than the one running the CCP 106) except when such communication is selectively enabled by the CCP 106. In other words, traditional in-line interception has an access-control model (and corresponding scalability and performance issues as the list of access-control rules grows), while the present invention focuses on selectively enabling conduits.

Figure 9:
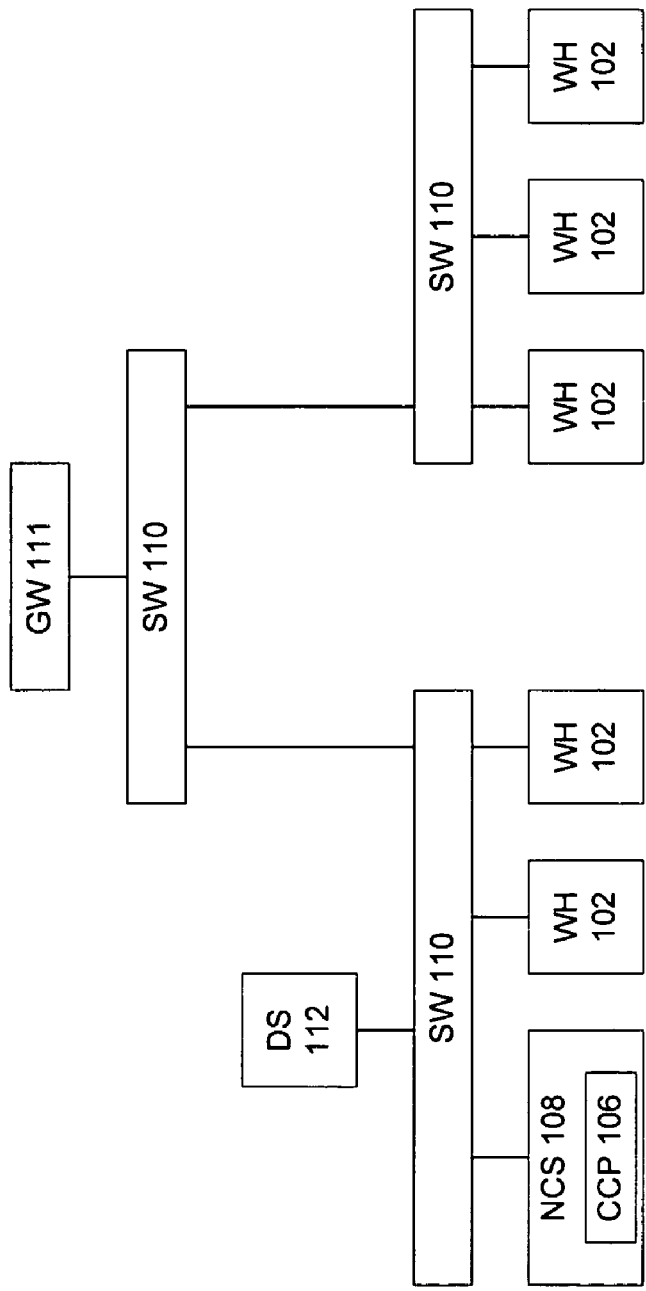
FIG. 9 is a diagram illustrating a containment communication proxy in a networked communication server, a number of contained workstation hosts, as well as other elements, according to an embodiment of the present invention.

FIG. 9 is a diagram illustrating a CCP 106 in an NCS 108, a number of contained workstation hosts 102, and the following elements:

Multiple network-switch devices (SW) 110, which together comprise one network broadcast domain within a network;

A network gateway (GW) 111 which handles traffic between the broadcast domain and the rest of the network;

The DHCP server (DS) 112 for the broadcast domain.

FIG. 9 illustrates a broadcast domain composed of any number of network switches and other network devices collectively serving to connect a number of hosts into a broadcast domain sharing a DHCP server and network gateway. Lines between the boxes indicate physical network connection, e.g. each workstation host 102 is connected to a switch 110; the DHCP server 112 is connected to a switch 110; the CCP 106 is connected to a switch 110; switches 110 may be connected to other switches 110; one switch 110 is connected to the gateway 111.

Figure 10:
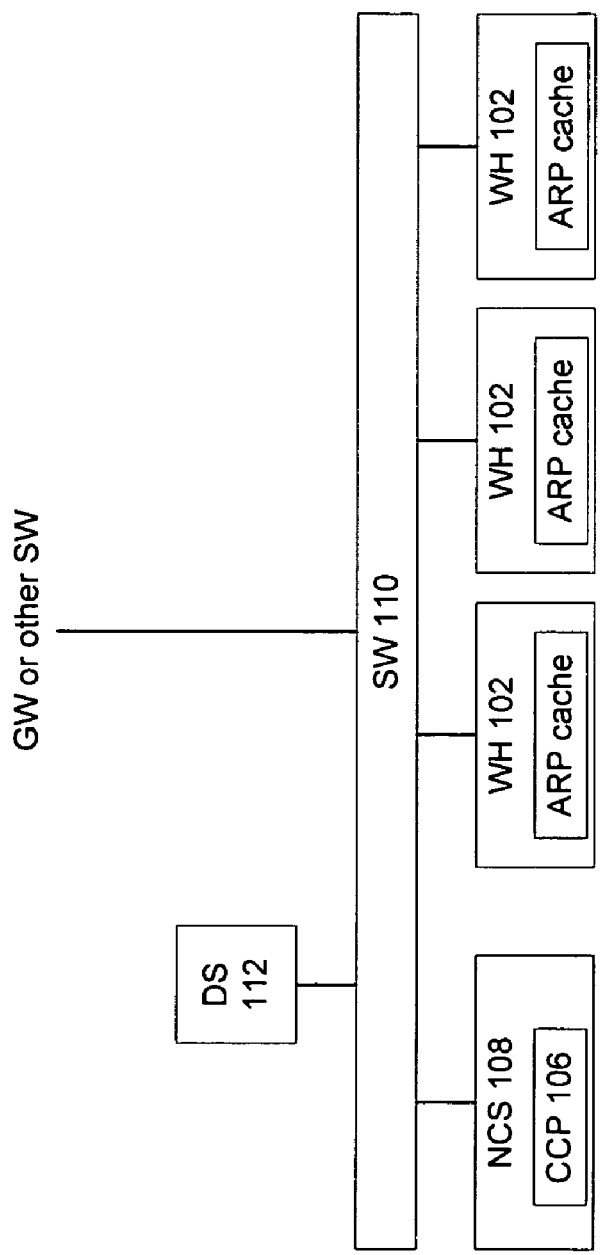
FIG. 10 is a diagram illustrating a simplified version of FIG. 9 with one switch, according to an embodiment of the present invention.

FIG. 10 is a diagram illustrating a simplified version of FIG. 9, showing one switch as well as one workstation host 102 shown in detail, though the same detail applies to other workstation hosts 102. The unterminated lines connected to switch 110 indicate switch ports used for connections to other hosts and other switches 110 or a gateway 111.

Figure 11:
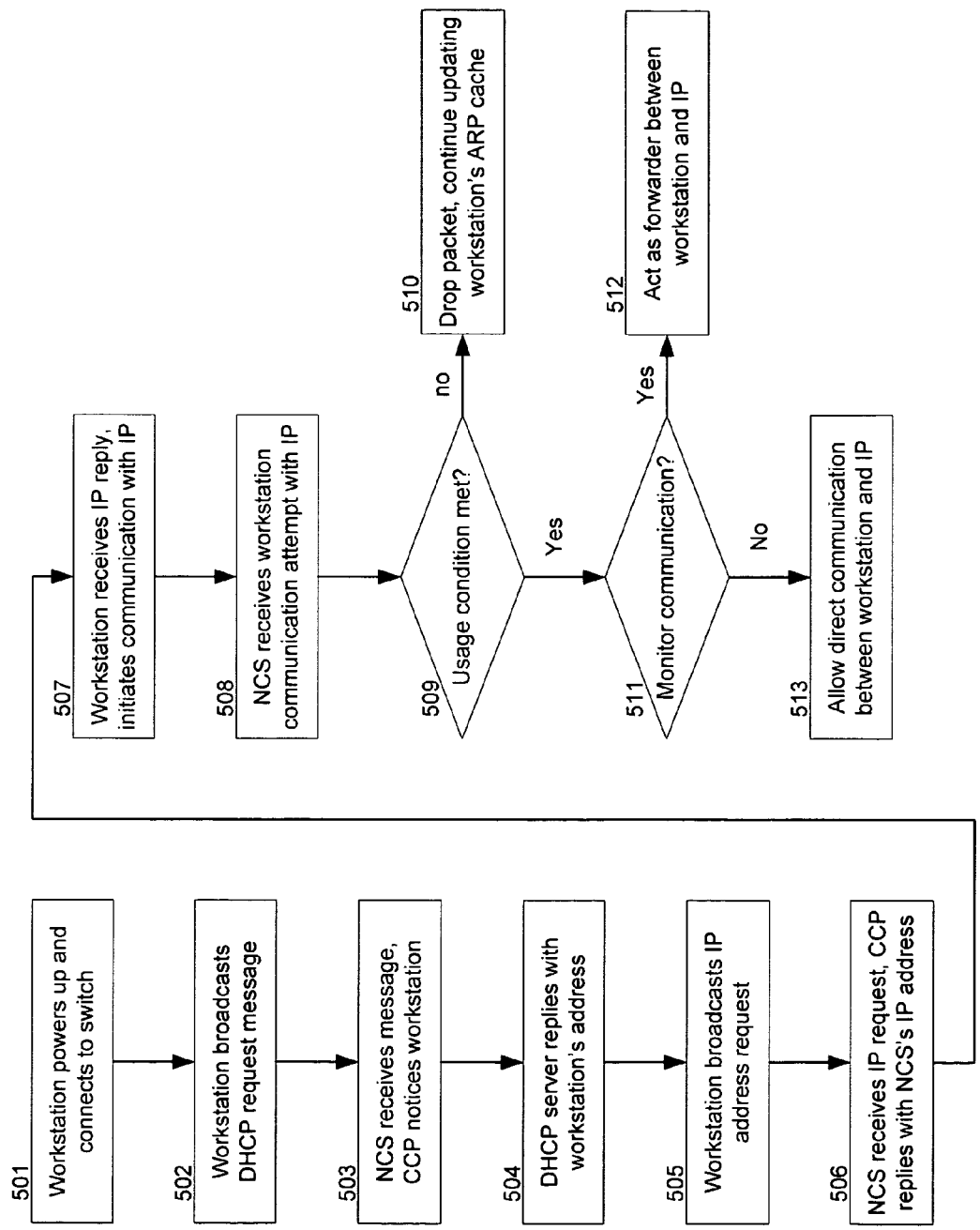
FIG. 11 is a flow chart illustrating a method for containment of network communication, according to an embodiment of the present invention.

FIG. 11 is a flow chart illustrating a method for containment of network communication, according to an embodiment of the present invention.

(a) Workstation host 102 either powers up 501 connected to switch 110, or is physically connected to switch 110 after power-up.

(b) Workstation host 102 sends 502 a broadcast message to request DHCP service. This message is sent to every host in the broadcast domain, including the DHCP host 112 and NCS 108.

(c) NCS 108 receives 503 the broadcast message, which is handled by CCP 106. CCP 106 becomes aware of a newly active host broadcasting with an Ethernet address of E1. Optionally, NCS 108 flushes the newly active host's ARP cache with a series of DHCP reply messages, binding some or all of the IP addresses in the subnet to the Ethernet address of the NCS 108.

(d) DHCP host 112 receives the broadcast message and sends 504 (via unicast not multicast) a DHCP reply to workstation host 102 to inform workstation host 102 of its IP address. Workstation host 102 now has an IP address to use for network communication, but cannot communicate with any host except via multicast, since it has no information about what Ethernet address to use to communicate with any particular IP address (except when such info resides in the workstation host's 102 cache, in which case flushing the workstation host's 102 cache as in step (c) above remedies this).

(e) Workstation host 102 sends 505 a broadcast message with an ARP request for a particular IP address I2, in effect asking the host with that IP address to reply so that workstation host 102 gets the Ethernet address for the particular IP address.

(f) Some host responds to the ARP message with its Ethernet address, effectively creating a new entry in workstation host's 102 ARP cache so that workstation host's 102 attempts to communicate with I2 will be directed to an Ethernet address E2.

(g) NCS 108 receives 506 the broadcast ARP message, which is handled by CCP 106.

(h) CCP 106 also responds 506 to workstation host's 102 ARP message with NCS's 108 Ethernet address, effectively over-writing the new entry in workstation host's 102 ARP cache such that workstation host's 102 attempts to communicate with I2 will result in packets being directed to NCS 108. Because CCP's 106 response might not be the first to arrive at workstation host 102, CCP 106 responds multiple times to ensure that its over-ride occurs after host I2/E2's ARP response.

(i) Workstation host 102 sends 507 a unicast message in a packet or packets to I2 using NCS's 108 Ethernet address in order to initiate communication with I2 and thereby use a service offered by I2.

(j) NCS 108 receives 508 these packet(s), such reception identified by CCP 106 as an attempt to use a new conduit. NCS 108 determines which of 3 courses of action to take, based on whether the conditions for usage are met 509:

If not met, NCS 108 drops 510 the packets, continues to update workstation host's 102 ARP cache to control the mapping of IP address I2 and drops any future packets from workstation host 102 to I2.

If met, and if 511 there is a need to monitor communication on this conduit, NCS 108 forwards 512 workstation host's 102 network traffic by using ARP to obtain the Ethernet address for I2, and by sending workstation host's 102 traffic to I2/E2. Subsequently, NCS 108 both receives packets from workstation host 102 for I2 and forwards them, and also receives packets from I2 for workstation host 102 and forwards them.

If met, and there is no need to monitor communication on this conduit, NCS 108 uses ARP communication to remove 513 the I2/NCS entry in workstation host's 102 ARP cache in order to enable direct packet exchange between workstation host 102 and I2 without direct involvement from NCS 108.

Note however, that whichever of these cases apply, NCS 108 still selectively enables the workstation host's communication with any other host besides I2 until, and unless, workstation host 102 attempts to communicate with some other host and NCS 108 enables that communication with the third action above (under step (j)).

Figure 12:
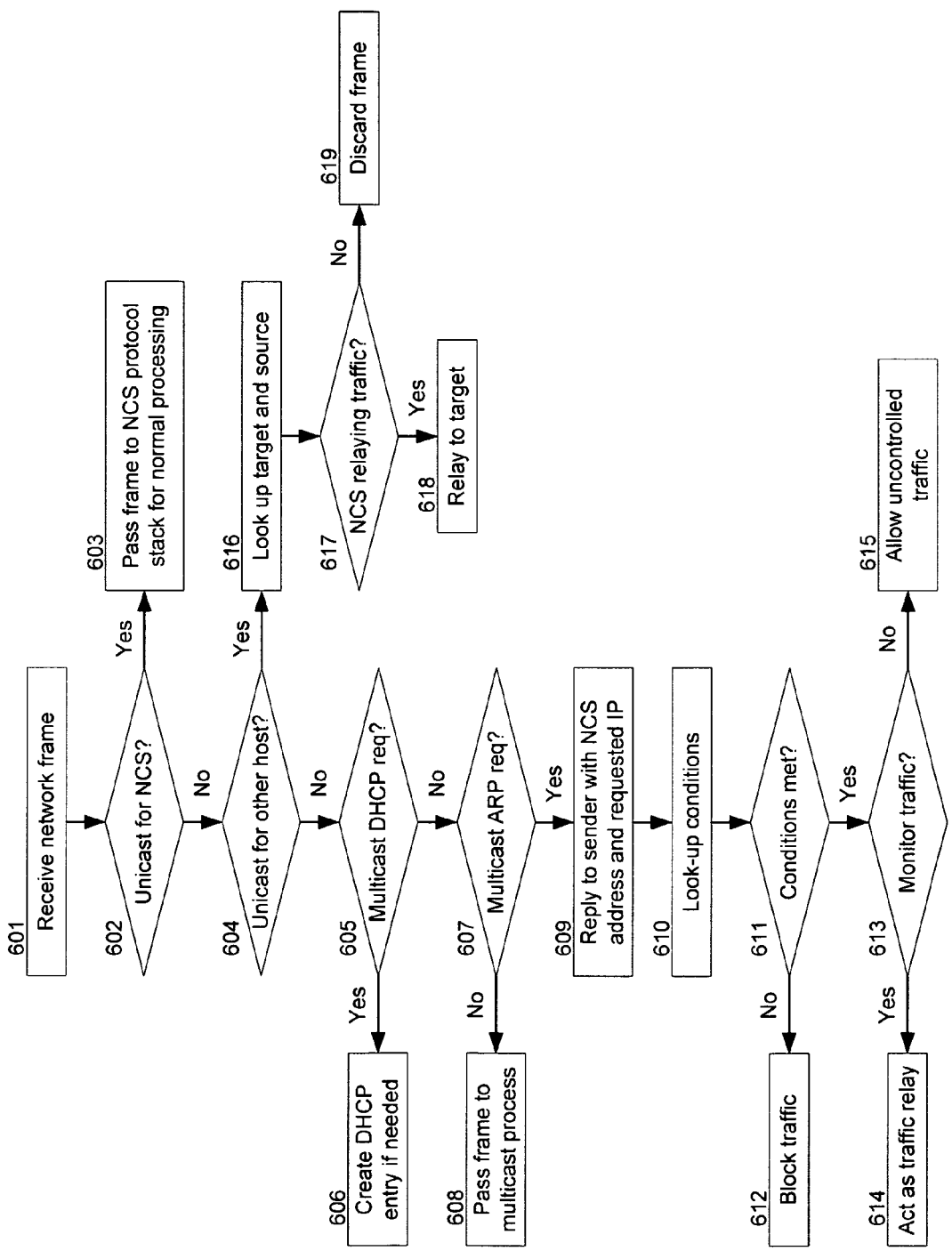
FIG. 12 is a flow chart illustrating a method for containment of network communication as performed by a containment communication proxy upon reception of a frame from network, according to an embodiment of the present invention.

FIG. 12 is a flow chart illustrating a method for containment of network communication as performed by CCP 106 upon reception 601 of a frame from network, according to an embodiment of the present invention. Once a CCP 106 receives 601 a frame, it performs the following steps:

(a) Is 602 the frame for a unicast for the NCS 108 itself? If yes, go to (b). If no, go to (c).

(b) Pass 603 the frame to NCS 108 protocol stack for normal unicast processing. End.

(c) Is 604 the frame for a unicast for another host? If yes, go to (o). If no, go to (d).

(d) Is 605 the frame for a multicast DHCP request? If yes, go to (e). If no, go to (f).

(e) Use 606 the data in packet's Ethernet and MAC data to look up DHCP requestor in hosts table. If not found, create new entry. Perform any required logging. End. Optionally, flush the DHCP requestor's ARP cache with a series of DHCP reply messages, binding some or all of the IP addresses in the subnet to the Ethernet address of the NCS 108.

(f) Is 607 the frame a multicast ARP request? If yes, go to (h). If no, go to (g).

(g) Pass 608 the frame to NCS 108 protocol stack for normal multicast processing. End.

(h) Send 609 an ARP reply to the sender, with NCS's 108 Ethernet address, and the IP address requested by the sender. Resend at intervals for configured time window, to ensure that the sender's ARP cache entry for the IP has NCS's 108 Ethernet address. Update the ARP-requestor host's entry in host table to show NCS is controlling the requested IP address for the ARP-requestor host.

(i) Use 610 the information in the ARP-requestor host's entry in host table to look up the appropriate actions in conditions table. Evaluate the conditions.

(j) Are 611 the conditions met? If no, go to (k). If yes, go to (l).

(k) Update 612 the ARP-requestor host's entry in host table to show NCS 108 is blocking traffic between ARP-requestor host and requested IP address. End.

(l) Determine 613 whether NCS 108 should continue to monitor traffic between ARP-requestor host and requested IP address. If yes, go (m). If no, go to (n).

(m) Update 614 the ARP-requestor host's entry in host table to show NCS 108 is relaying traffic between ARP-requestor host and requested IP address. End.

(n) Update 615 the ARP-requestor host's entry in host table to show NCS 108 is not controlling traffic between ARP-requestor host and requested IP address. Send ARP reply message to ARP-requestor host to set ARP cache entry for Ethernet address of requested IP address. End (o) Use 616 the data in packet's Ethernet and MAC data to look up both the target host and source host in the host table. Is 617 NCS 108 relaying traffic between source host and target host? If yes, go to (p). If no, go to (q).

(p) Send 618 the frame's payload in a frame to the target host. End.

(q) Discard 619 frame. End.

Note that the test and action in steps (a) and (b) exist because NCS 108 itself can act as an ordinary host originating network communication to other hosts, e.g. CCP 106 software sending log data to a remote log server, as well as be the target of communication originated from other hosts, e.g. administrative software sending new information to CCP 106. In these cases, the packets will have the NCS's 108 true IP address as the destination address, and NCS's 108 actions will be the normal actions to communicate with the other host (e.g., log host, administrative server) in the normal manner.

Not shown in FIG. 12 are instances where CCP 106 initiates containment activity on its own, rather than in response to receiving frames. In one such case, CCP 106 may receive administrative messages (via one or more frames handled via step (b)) instructing CCP 106 to change the way it controls the host address space mapping of some or all of the hosts contained by the CCP 106. In such a case, the CCP 106 may send one or more ARP messages to one or more hosts in order to change the host address space mapping contained in the ARP cache of each host.

It is an advantageous aspect of the present invention that, coupled with a mechanism for human confirmation, the invention can be used to implement service on human demand, for example in order to prevent any autonomous software (malicious or otherwise) from using any service without human consent. Notably, one result is to prevent malicious software from spreading itself from host to host automatically, and from gaining usage of network-accessible services in order to abuse the resources managed by the service or to attack the service itself.

A similar technique can be used with other types of conditions (e.g. administrative authorization, temporary usage on demand) to limit a server's usage of other services to only the services that the server needs to use. Notably, one result is to close off many communication paths that can otherwise be used by malicious software to spread itself from one host to another. For example, a Web server that does not need to function as a Web client (i.e. does not need to send HTTP requests to other Web servers, as is the case with a great many Web servers) may be explicitly disabled from sending HTTP requests to other Web server. The result is that a malicious piece of software which has compromised one Web server via the Web server's HTTP service, cannot communicate with other Web servers in order to attack them, even though the malicious piece of software is running on a compromised Web server host.

As usage policies evolve, administrators are able to use administrative actions in order to modify the conditions that are enforced by containment mechanisms. However, pre-defined alternative sets of conditions, or regimes, can be used as a powerful tool for incident response. While a "normal" set of conditions for a specific containment mechanism may be regarded as appropriate for typical usage, a different regime with more stringent conditions may be appropriate for atypical situations, e.g. high-caution end-of-fiscal-quarter processing, or high-risk situations resulting from security alerts or even security incidents in progress. Significant automation of situation management or incident response can be achieved by automating specific regime-change operations for one or more containment mechanisms to be accomplished with a single administrative action.

When deployed over time, a set of containment mechanisms can be used to implement a technique for "self-assembling authorization without access-control." In an ideal authorization management for an IT system, every actor uses every resource that it needs and is simultaneously blocked from using any other resource. Even modest steps toward this ideal are impractical with an access-control approach based on building an extensive corpus of a priori access-rules and policies. However, containment mechanisms provide the general technique to provide usage upon demand when the demand is deemed legitimate according to conditions that need not be based on the identity of the using entity or used entity. When conditions include historical usage patterns and require confirmation or authorization of new usage, a confirmation mechanism can build up an authorization model for each using entity it contains. The confirmation or authorization of new usage ensures that changes to the authorization model occur as needed, and time-frame conditions can ensure that demonstration of "need to use" can be refreshed periodically. Consequently, authorization decisions are made (and saved for later use) as the need arises, and updated as changed needs dictate, by the parties knowledgeable about the needs, rather than requiring a priori definition of access-rules and complex definitions of groups, roles, entitlements, object types, and other forms of equivalence classes for the classical "subject/object" relationship in access-control theory.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method to be executed by a processor within a network having a client, comprising:
   intercepting a connection request within the network, wherein the connection request is initiated from the client to establish a communication conduit between the client and a server in order to access a specific service on the server;
   identifying the communication conduit corresponding to the client, the server, and the specific service;
   identifying one or more usage conditions associated with the communication conduit, wherein the one or more usage conditions are defined to permit conditional use of the communication conduit by the client; and
   determining whether the one or more usage conditions permit the connection request to be sent to the server, and wherein one of the one or more usage conditions that would permit the connection request to be sent includes a persistent usage condition in which the communication conduit was previously authorized and a designated time interval for the persistent usage condition has not lapsed.

2. The method of claim 1, further comprising the step of forwarding the connection request to the server over the communication conduit when the one or more usage conditions are met.

3. The method of claim 2, wherein the identifying the communication conduit comprises identifying a first network address of the server, a second network address of the client, a port number of the communication conduit, and the specific service associated with the port number.

4. The method of claim 3, further comprising the step of sending a plurality of DHCP reply messages for binding a first address of a first host to a second address of a second host, the plurality of DHCP reply messages sent to a third host, the server residing on the first host, and the client residing on the third host.

5. The method of claim 2, wherein the determining step comprises (a) obtaining a confirmation from a human, and (b) determining whether the communication conduit was used by the client prior to the client's sending the connection request.

6. The method of claim 2, wherein the determining step comprises obtaining a confirmation from a human, wherein the human (a) is associated with the client or (b) has administrative privilege.

7. The method of claim 2, wherein the determining step comprises (a) determining whether the client used the communication conduit at any time prior to the client's sending the connection request, (b) determining whether the client used the communication conduit within a specific time-window prior to the client's sending the connection request, or (c) determining whether the client used the communication conduit within a pre-determined context prior to the client's sending the connection request, wherein the pre-determined context comprises a TCP connection or a session.

8. The method of claim 2, wherein the determining step comprises determining whether a configuration of the client comprises one or more pre-determined data.

9. The method of claim 2, wherein the determining step comprises determining whether a repository comprises one or more authorization data pertinent to the connection request.

10. The method of claim 2, wherein the determining step comprises authorizing temporary usage of the communication conduit, wherein the temporary usage expires unless administrative approval is obtained (a) within a pre-determined time-window, (b) before the client sends a pre-determined number of messages, or (c) before the client uses a pre-determined number of distinct contexts, wherein a context comprises a TCP connection or a session.

11. The method of claim 2, wherein the determining step comprises determining whether the connection request is sent within a pre-determined time-window.

12. The method of claim 11, wherein the pre-determined time-window comprises one or more weekday peak usage hours.

13. The method of claim 1, further comprising the step of discarding the connection request when the one or more usage conditions are not met.

14. The method of claim 13, wherein the identifying the communication conduit comprises identifying a first network address of the client, a second network address of the server, a port number of the communication conduit, and the specific service associated with the port number.

15. The method of claim 1, further comprising the step of logging a result of the determining step.

16. The method of claim 1, further comprising the step of notifying a system-administrator of a result of the determining step.

17. A method to be executed by a processor within a network having a client, comprising:
    intercepting a service-initiation request within the network, wherein the service-initiation request is initiated from the client in order to access a specific service on a server;
    identifying a request-type corresponding to the service-initiation request and the specific service;
    identifying one or more service conditions associated with the request-type, wherein the one or more service conditions are defined to permit conditional use of the request-type by the client; and
    determining whether the one or more service conditions permit the service-initiation request to be sent to the server, and wherein one of the one or more service conditions that would permit the service-initiation request to be sent include a persistent usage condition in which the request-type was previously authorized and a designated time interval for the persistent usage condition has not lapsed.

18. The method of claim 17, further comprising the step of forwarding the service-initiation request to the server over the network when the one or more service-conditions are met.

19. The method of claim 18, wherein the determining step comprises identifying a first network address of the server and a second network address of the client.

20. The method of claim 19, further comprising the step of sending a plurality of DHCP reply messages for binding a first address of a first host to a second address of a second host, the plurality of DHCP reply messages sent to a third host, the server residing on the first host, and the client residing on the third host.

21. The method of claim 18, wherein the determining step comprises (a) obtaining a confirmation from a human or (b) determining whether the client sent the service-initiation request within an authorized time window.

22. The method of claim 18, wherein the determining step comprises determining whether a second service-initiation request of a same request-type as the service-initiation request (a) was forwarded to the server at any time prior to the client's sending the service-initiation request (b) was forwarded to the server within a pre-determined time-window prior to the client's sending the service-initiation request, or (c) was forwarded to the server within a specific context, wherein a context comprises a TCP connection or a session.

23. The method of claim 18, wherein the determining step comprises determining whether a second service-initiation request of one or more pre-determined request-types (a) was forwarded to the server at any time prior to the client's sending the service-initiation request, (b) was forwarded to the server within a pre-determined time-window prior to the client's sending the service-initiation request, or (c) was forwarded to the server within a specific context, wherein a context comprises a TCP connection or a session.

24. The method of claim 17, further comprising discarding the service-initiation request when the one or more service conditions are not met.

25. The method of claim 24, wherein the determining step comprises identifying a first network address of the client and a second network address of the server.

26. The method of claim 17, further comprising the step of logging a result of the determining step.

27. The method of claim 17, further comprising the step of notifying a system-administrator of a result of the determining step.

28. A system within a network having a client, comprising:
    a communication proxy for intercepting a connection request within the network, wherein the connection request is initiated from the client to establish a communication conduit between the client and a server in order to access a specific service on the server,
    wherein the communication proxy comprises one or more processors programmed to execute one or more sequences of instructions, including:
        identifying the communication conduit corresponding to the client, the server, and the specific service;
        identifying one or more usage conditions associated with the communication conduit, wherein the one or more usage conditions are defined to permit conditional use of the communication conduit by the client;
        determining whether the one or more usage conditions permit the connection request to be sent to the server, and wherein one of the one or more usage conditions that would permit the connection request to be sent includes a persistent usage condition in which the communication conduit was previously authorized and a designated time interval for the persistent usage condition has not lapsed.

29. The system of claim 28, wherein the one or more sequences of instructions executed by the one or more processors of the communication proxy further include (a) obtaining a confirmation from a human, and (b) determining whether the communication conduit was used by the client prior to the client sending the connection request.

30. The system of claim 28, wherein the one or more sequences of instructions executed by the one or more processors of the communication proxy further include identifying a first network address of the server, a second network address of the client, a port number of the communication conduit, and the specific service associated with the port number.

31. The system of claim 30, wherein the one or more sequences of instructions executed by the one or more processors of the communication proxy further include sending a plurality of DHCP reply messages for binding a first address of a first host to a second address of a second host, the plurality of DHCP reply messages sent to a third host, the server residing on the first host, and the client residing on the third host.

32. The system of claim 30, wherein the communication proxy resides in a network element, the network element in a communication path between the client and the server.

33. The system of claim 30, wherein the communication proxy and the client reside on the same host.

34. The system of claim 30, wherein the communication proxy and the server reside on the same host.

35. A system within a network having a client, comprising:
a service-proxy for intercepting a service-initiation request within the network, wherein the service-initiation request is initiated from the client in order to access a specific service on a server,
wherein the service-proxy comprises one or more processors configured to execute one or more sequences of instructions, including:
identifying a request-type corresponding to the service-initiation request and the specific service;
identifying one or more service-conditions associated with the request-type, wherein the one or more service-conditions are defined to permit conditional use of the request-type by the client;
determining whether the one or more service-conditions permit the service-initiation request to be sent to the server, and wherein one of the one or more service-conditions that would permit the service-initiation request to be sent include a persistent usage condition in which the request-type was previously authorized and a designated time interval for the persistent usage condition has not lapsed.

36. The system of claim 35, wherein the one or more sequences of instructions executed by the one or more processors of the service-proxy further include (a) obtaining a confirmation of the one or more service-conditions being met from a human or (b) determining whether the client set the service-initiation request within an authorized time-window.

37. The system of claim 35, wherein the one or more sequences of instructions executed by the one or more processors of the service-proxy further include identifying a first network address of the server and a second network address of the client.

38. The system of claim 37, wherein the one or more sequences of instructions executed by the one or more processors further include sending a plurality of DHCP reply messages for binding a first address of a first host to a second address of a second host, the plurality of DHCP reply messages sent to a third host, the server residing on the first host, and the client residing on the third host.

39. The system of claim 37, wherein the service-proxy resides in a network element, the network element in a communication path between the client and the server.

40. The system of claim 37, wherein the service-proxy and the client reside on the same host.

41. The system of claim 37, wherein the service-proxy and the server reside on the same host.

\* \* \* \* \*